United States Patent Office 2,938,874
Patented May 31, 1960

2,938,874

PREPARATION OF PHOSPHATE-CONTAINING ALUMINA GELS

Edward J. Rosinski, Almonesson, N.J., assignor to Socony Mobil Oil Company, Inc., a corporation of New York No Drawing. Filed June 20, 1956, Ser. No. 592,485

9 Claims. (Cl. 252—437)

This invention relates to a process for the formation of porous, adsorptive inorganic oxide gels which contain alumina and which are characterized by an appreciable content of phosphate. More particularly, the present invention is concerned with the preparation of phosphate-containing alumina hydrogels and with the preparation of porous adsorbent products obtained upon removal of water from said hydrogels.

Various methods have heretofore been proposed for preparing compounds comprising a combination of aluminum and phosphorus. Thus, phosphate-containing aluminum materials have been used as catalysts in the synthesis of organic amines by vapor phase catalytic interaction of alcohols with ammonia. Combinations containing phosphate and aluminum, such as aluminum phosphate, have also been used in accelerating various types of reactions among organic compounds and particularly in accelerating and directing olefin polymerization reactions. The foregoing combinations of aluminum and phosphate have generally been employed in catalytic reactions in the form of irregularly shaped particles or in the form of pellets produced by extrusion, casting, or the like. The use of particles in spheroidal form offers several advantages, particularly when the product is employed as a catalyst or catalyst component for the conversion of petroleum hydrocarbons or as an adsorbent or treating or refining agent. Thus, spheroidal particles permit more uniform packing in a reaction or contacting zone and thereby reduce variations in pressure drop and in channeling of reactants or fluids through only a portion of the contact bed. In addition, spheroidal particles are more resistant to attrition, particularly in moving bed processes since there are no sharp edges to break or wear off during the necessary handling and processing.

One of the principal objects of the present invention is the provision of a process for preparing phosphate-containing alumina hydrogels of high solids content which can be washed or otherwise subjected to wet processing, i.e., contacted with aqueous media without undergoing appreciable disintegration. Another object is to afford a method for producing phosphate-containing alumina hydrosols characterized by a short time of gelation. A still further object is the provision of a process for manufacturing phosphate-containing alumina hydrogels in the form of spheroids of such stability that they may be washed free of water-soluble matter and dried to form hard, porous adsorbent particles.

The above and other objects which will be apparent to those skilled in the art are achieved in accordance with the present invention wherein true all-embracing hydrogels consisting of alumina or comprising alumina as the principal metal oxide constituent and containing a substantial amount of phosphate are prepared by reacting in aqueous solution a water-soluble basic aluminum salt and a water-soluble ammonium acid phosphate to yield a phosphate-containing alumina sol which sets to an all-embracing hydrogel having a pH between about 3 and about 5, and thereafter treating the hydrogel so obtained in a basic medium to render the hydrogel resistant to disintegration upon contacting with aqueous media. The hydrogel may thereafter be contacted with such aqueous treating solutions as are desired for density control, base-exchange, impregnation, or the like, finally water-washed free of soluble matter, and dried. When the resulting phosphate-containing alumina gel is to be used as a catalyst or catalyst support, it is generally calcined at an elevated temperature between about 800° F. and about 1400° F.

It is emphasized that the present process is directed to a method for preparing true hydrogels as distinguished from gelatinous precipitates. It has heretofore been taught that the presence of electrolyte salts in the desired alumina hydrogel forming mixture has the detrimental effect of coagulating the aluminum ions in the form of an irreversible gelationous precipitate and not in the form of true hydrogel. The gelatinous precipitates so produced are incapable of being formed into desired spheroidal particles by introduction thereof in a water-immiscible liquid and, further, have disadvantages of being structurally weak as compared with true hydrogels and of generally possessing a heterogeneous structure in comparison with the homogeneous structure achieved with true hydrogel formation. In accordance with the present invention, it has now been discovered that the presence in the alumina hydrogel-forming mixture of an ammonium acid phosphate under the conditions hereinafter set forth does not serve to coagulate the reactants in the form of a gelatinous precipitate but, on the contrary, permits the formation of a true hydrogel which, after being aged under the conditions set forth hereinbelow, can be subjected to extensive washing without undergoing disintegration and thereafter dried and, if desired, calcined.

The present invention thus contemplates a method for preparing phosphate-containing alumina hydrogels which, when dried, yield porous adsorptive phosphate-containing alumina hydrogels. It has been found that a stable phosphate-containing alumina hydrogel may be prepared by mixing aqueous solutions of water-soluble basic aluminum salts with ammonium acid phosphate to yield a homogeneous precipitate-free, phosphate-containing alumina hydrosol characterized by a pH within the approximate range of 3 to 5 and permitting the sol to set to a hydrogel. The resulting hydrogel is then aged in a basic medium for a sufficient time to substantially neutralize the hydrogel, thereby rendering said hydrogel resistant to disintegration upon subsequent contact with aqueous media.

Generally, hydrogels prepared by the process described herein are characterized by a gelation time of not more than 2 hours and a solids content of between about 5 and about 30 percent by weight although it is to be realized that hydrogels having a longer time of set and a lesser solids content, when desired, may also be produced by the present method. The method of this invention is particularly suitable for the production of hydrogels characterized by a time of set in the range of 0.5 to 20 seconds, which hydrogels are capable of being formed into spheroidal particles upon introducing the hydrosol in the form of globules into a water-immiscible medium and maintaining the hydrosol globules in said medium until they set to globules of hydrogel.

The essential compounds required for forming phosphate-containing alumina gel in accordance with the present process include a water-soluble basic aluminum salt and an ammonium acid phosphate. These compounds may be intimately admixed in aqueous solution in any desired manner to yield a resulting hydrosol. The solutions may be contacted by flowing streams thereof together under conditions of rapid flow such as in a mixing nozzle. Additional components may be introduced at this stage by dissolving a suitable compound of the desired component in one of the hydrosol forming solutions or by mixing a stream of a compound of such desired component with the streams of the two reactants.

The water-soluble basic aluminum salt employed may be any of the commercial salts of this nature. These salts may be generally characterized by the formula: $[Al_a(OH)_bY_c]_x$ where Y is an acid anion, such as $Cl^-$, $NO_3^-$, $Br^-$, $I^-$; $a$ is a number between 1 and 10; $b$ is a number between 1 and 29; $c$ is a number between 1 and 29; and $x$ is a number between 1 and 100, and more generally between 1 and 10. The basic aluminum salts may be readily prepared by reacting metallic aluminum, water, and the requisite acid in an amount sufficient to form the normal aluminum salt. Thus, basic aluminum chloride is prepared by reacting aluminum with a deficiency of hydrochloric acid in the presence of water at an elevated temperature, for example 200–220° F. for 6–24 hours, the particular reaction time chosen, depending on the state of subdivision of the metal. With very finely divided aluminum, a comparatively shorter reaction time is required than with aluminum in the form of relatively large size pieces. Basic aluminum nitrate may be prepared in a similar manner using nitric instead of hydrochloric acid. Basic aluminum chloride and basic aluminum nitrate are preferred for use as the water-soluble basic aluminum salt reactant in the present process. Other suitable representative compounds include basic aluminum bromide and basic aluminum iodide. It is essential that the basic aluminum salt employed be substantially or completely soluble in water at room temperature. Basic aluminum salts which are water-insoluble, for example, the basic aluminum salts of carboxylic acids such as basic aluminum acetate, are not suitable for use in the present process. The basicity of the basic aluminum salt employed has a pronounced effect on the amount of ammonium acid phosphate required for gelation. If the aluminum to acid anion ratio, i.e., Y in the above designated formula is less than about 1.8 to 1, excessive amounts of the ammonium acid phosphate reactant are required for gelation. If the aluminum to acid anion ratio is greater than about 2.2 to 1, on the other hand, the solubility of the basic aluminum acid salt in water is reduced. It is accordingly a preferred embodiment of the instant invention to utilize a water-soluble basic aluminum acid salt in which the aluminum/acid anion ratio is between about 1.8/1 and about 2.2/1.

The ammonium acid phosphate reactant used will generally be an aqueous solution of diammonium hydrogen phosphate $[(NH_4)_2HPO_4]$ or ammonium dihydrogen phosphate $(NH_4H_2PO_4)$. Particularly good results have been achieved using ammonium dihydrogen phosphate and this compound is accordingly preferred. The quantity and strength of ammonium acid phosphate solution to be used will generally be controlled to yield a phosphate-containing residue in the alumina gel product amounting to at least about 10 percent by weight and generally from about 30 to about 60 percent by weight of the final composite. In those instances where it is desired to cogel with the alumina the oxides of other metals, weak acid water-soluble salts of such metals may be suitably included in the reactant mixture. Thus, for preparing a cogel of alumina and chromia in accordance with the present invention, basic aluminum chloride and chromium acetate may be suitably mixed in aqueous solution with ammonium dihydrogen phosphate to give a phosphate-containing alumina-chromia hydrosol which sets to a hydrogen of corresponding composition.

The phosphate-containing alumina hydrosols prepared in accordance with the present process may be allowed to set to an all-embracing hydrogel in the form of a mass which is thereafter broken up or cut up into particles for wet processing. An alternate and preferred method of preparing the phosphate-containing alumina hydrogel particles is to drop the hydrosol in the form of globules into a column of water-immiscible liquid so that spheroidal bead-like particles of hydrogel are formed upon gelation of the hydrosol globules while maintained in the liquid.

Thus, in a preferred embodiment of the invention, the phosphate-containing alumina sol is passed in finely divided form into a water-immiscible liquid maintained at an elevated temperature and retained therein until gelation occurs. The phosphate-containing alumina sol prepared in accordance with the present process will not set instantaneously to a gelatinous mass but, on the other hand, will set to a gel within a reasonable time. This time differential may be controlled by variation in solids content of the hydrosol and by regulation of the temperature of the water-immiscible liquid into which the hydrosol is introduced. Such time differential permits passing the hydrosol into the water-immiscible liquid so that the sol may assume the desired spheroidal shape and set to a hydrogel during passage through the liquid. When the hydrosol is formed into spheroidal particles employing the above technique, the gelation time is suitably less than 20 seconds.

The solutions of basic aluminum salt and ammonium acid phosphate used in formation of the present hydrosols are preferably mixed and introduced into the water-immiscible liquid at substantially room temperature. However, the water-immiscible liquid may be maintained at an elevated temperature in order to obtain gelation within the desired time. Thus, the temperature of the water-immiscible liquid is desirably maintained above room temperature and generally within the range of from about 70° F. to about 150° F. It will accordingly be understood that the time during which the hydrosol and resulting hydrogel remain in the water-immiscible liquid and the temperature of such liquid are correlated to obtain the desired particles and that these conditions are inversely related so that if the temperature is increased, the time may be decreased.

While the water-immiscible liquid in which gelation takes place may have a density higher than the phosphate-containing alumina hydrogel particles, in which instance the hydrogel particles rise upwardly through the liquid, such method is ordinarily less preferred than in the case where the liquid has a lower density, allowing the hydrosol to be introduced at the top of a column thereof and the spheroidal hydrogel particles formed therein to descend to the bottom of such column. A particularly suitable water-insoluble medium comprises organic liquids, such as kerosene, gas oils, etc., of such viscosity and density characteristics that the phosphate-containing alumina hydrosol introduced therein in the form of globules will settle at a rate such that the hydrosol sets to spheroidal particles of hydrogel during its passage through the liquid.

The phosphate-containing alumina hydrogel particles are thereafter removed from the water-immiscible setting liquid. It is important that the particles not be contacted with water at this stage since they are water-soluble and hence subject to disintegration. The freshly formed hydrogel is suitably brought into contact with a basic medium, such as an aqueous solution of an ammonium compound. Suitable ammonium compounds include ammonium hydroxide and water-soluble ammonium salts, such as ammonium chloride, ammonium sulfate, ammonium nitrate, ammonium acetate, etc. It is particularly preferred to treat the freshly formed hydrogel in an aqueous solution of an ammonium hydrogen phosphate compound, such as employed as one of the reactants in formation of the phosphate-containing hydrogel. Thus, in a preferred embodiment of the invention, the freshly formed phosphate-containing alumina hydrogel is treated in an aqueous solution of ammonium dihydrogen phosphate. Generally, the treating solution will contain a concentration of ammonium salt or ammonium hydroxide of between about 1 to about 20 percent by weight. The temperature of the basic treating medium is desirably room temperature although elevated temperatures up to about 212° F. may be used. The time of contact is generally at least 10 hours and may extend up to 48 hours or longer.

Prior to the above-described treatment with ammonium solution, the hydrogel may be aged in a water-immiscible medium, such as an organic liquid. In such operation, it is particularly preferred to age the hydrogel at a temperature above about 125° F. for at least 10 hours and preferably at a temperature between about 150° F. and about 212° F. for from 15 to 48 hours in oil.

After the treatment with ammonium solution, and either with or without preliminary aging of the phosphate-containing alumina hydrogel in water-immiscible medium, the hydrogel particles are water-washed free of soluble matter. A particularly satisfactory method for washing the hydrogel is by percolation either with upward or downward flow of water and preferably with water containing a small amount of ammonium hydroxide. After washing, the hydrogel particles are dried at a temperature generally from about 200° F. to about 350° F. for 2 to 24 hours or more or dried at such temperature and then calcined at a temperature of from about 350° F. to about 1400° F. for 2 to 12 hours or more. Generally, it is preferred to dry the hydrogel particles in air or an atmosphere of superheated steam at a slow rate since such manner of operation has been found to result in less breakage of the gel particles. Calcination is ordinarily carried out in air although other inert atmospheres may likewise be used. The particular temperatures chosen for calcination will depend in part on the use to be made of the finished gel. Thus, where the gel is to be employed as an adsorbent, it is calcined in the approximate range of 350° F. to 800° F. If, on the other hand, the gel is to be used as a catalyst or catalyst support, the temperature of calcination is generally between about 800° F. and about 1400° F. If desired, the phosphate-containing alumina hydrogel particles may be treated with catalytic components prior to the drying, or drying and calcining operations, and the composite so obtained may then be subjected to the above-described drying and calcining.

The following examples will serve to illustrate the process of the invention without limiting the same:

*Example 1*

A phosphate-containing alumina hydrogel was prepared from the following reactants:

*Solution A.*—Water solution of basic aluminum chloride having a specific gravity at 70° F. of 1.179 and containing on a weight basis 13.48 percent alumina and 4.67 percent chlorine.

*Solution B.*—Water solution of ammonium dihydrogen phosphate having a specific gravity at 71° F. of 1.105 and containing by weight 18.1 percent $NH_4H_2PO_4$.

Solution A, flowing at a rate of 246 cc./min. was mixed in a nozzle with solution B, flowing at a rate of 168 cc./min. The hydrosol so formed was introduced into the top of a column of oil as a finely divided stream. The hydrosol so introduced assumed globular form and set in about 5.3 seconds at a temperature of 48° F. to spheroidal particles of hydrogel during passage through the oil column. The resulting hydrogel had a pH of 4.2.

The hydrogel particles so obtained were aged in a petroleum oil for 12 hours at 200° F. The aged hydrogel particles were then treated for 24 hours with an aqueous solution of 20 percent by weight ammonium chloride. The pH of the hydrogel after this treatment was 7.0. The hydrogel particles were thereafter washed with water containing a small amount (approximately 0.03 percent) of ammonia to remove water-soluble impurities. The hydrogel particles were then dried in superheated steam for 5 hours at 230° F. and for ½ hour more at 340° F. The dried particles were thereafter calcined in air for 3 hours at 1240° F. The final gel product in the form of hard spheroids consisted essentially of alumina and contained 44.2 percent by weight of $PO_4$. Such product had a density of 0.78 gram per cubic centimeter and a surface area of 167 square meters per gram.

*Example 2*

A phosphate-containing alumina hydrogel was prepared from the following reactants:

*Solution A.*—Water solution of basic aluminum chloride having a specific gravity at 70° F. of 1.179 and containing on a weight basis 13.4 percent alumina and 4.44 percent chlorine.

*Solution B.*—Water solution of ammonium dihydrogen phosphate having a specific gravity at 71° F. of 1.105 and containing by weight 18.1 percent $NH_4H_2PO_4$.

Solution A, flowing at a rate of 248 cc./min. was mixed in a nozzle with solution B, flowing at a rate of 156 cc./min. The hydrosol so formed, having a concentration of 96 grams $Al_2O_3$ per liter was introduced into the top of a column of oil as a finely divided stream. The hydrosol introduced assumed globular form and set in about 5.6 seconds at a temperature of about 48° F. to spheroidal particles of hydrogel during passage through the oil column. The resulting hydrogel had a pH of 3.3

The hydrogel particles so obtained were aged in a petroleum oil for 24 hours at 200° F. and thereafter treated for 24 hours with an aqueous solution of ammonium hydroxide containing about 5 percent by weight of ammonia. The pH of the hydrogel after this treatment was 10.2. The hydrogel particles were thereafter washed with water containing a small amount of ammonia (approximately 0.03 percent) to remove water-soluble impurities. The hydrogel did not undergo any disintegration during the aforementioned wet processing steps. The hydrogel particles were then dried in superheated steam for 5 hours at 230° F. and for ½ hour more at 340° F. The dried particles were thereafter calcined in air for 9 hours at 1000° F. The final phosphate-containing alumina gel product in the form of hard spheroids was characterized by a $PO_4$ content of 34.4 percent by weight and had a density of 0.82 gram per cubic centimeter.

*Example 3*

A phosphate-containing alumina hydrogel was prepared from the following reactants:

*Solution A.*—Water solution of basic aluminum chloride having a specific gravity at 70° F. of 1.179 and containing on a weight basis 13.4 percent alumina and 4.44 percent chlorine.

*Solution B.*—Water solution of ammonium dihydrogen phosphate having a specific gravity at 71° F. of 1.105 and containing 18.1 percent by weight of $NH_4H_2PO_4$.

Solution A, flowing at a rate of 250 cc./min. was mixed in a nozzle with Solution B, flowing at a rate of 156 cc./min. The hydrosol so formed, having a concentration of 98 grams $Al_2O_3$ per liter, was introduced into the top of a column of oil as a finely divided stream. The hydrosol so introduced assumed globular form and set in 4–5 seconds at a temperature of 47–54° F. to spheroidal particles of hydrogel during passage through oil column. The resulting hydrogel was hard and clear and had a pH of 3.4.

The hydrogel particles so obtained were treated 24 hours with an aqueous solution of 3 percent by weight $NH_4H_2PO_4$. The hydrogel particles were thereafter washed with water containing a small amount (approximately 0.03 percent) of ammonia to remove water-soluble impurities. The hydrogel did not undergo any disintegration during the wet processing steps. The hydrogel particles were then dried in superheated steam for 5 hours at 230° F. and for ½ hour more at 340° F. The dried particles were thereafter calcined in air for 3 hours at 1000° F. The phosphate-containing alumina gel product in the form of spheres had a PO₄ content of 53.3 percent by weight and had a density of 0.47 gram per cubic centimeter.

The phosphate-containing alumina gels produced in accordance with the process of this invention may be used as adsorbents, desiccants, and treating, refining or purifying agents, or as a catalyst, catalyst support, or component of a catalyst for the conversion of organic compounds. The phosphate-containing alumina gel product may be impregnated with various metals or metal oxides, such as those of chromium, molybdenum, tungsten, vanadium, platinum, palladium, osmium, iridium, ruthenium, rhodium, and the like. Also, the phosphate-containing alumina gel may be combined with cobalt molybdate or two or more metal oxides, for example, chromia and molybdena. Such products are particularly valuable in the form of hard, glassy spheroids since they are thereby rendered more resistant to abrasion and hence are well adapted to either static or moving bed type systems wherein the catalyst moves in a closed path, including a reactor and a regenerator.

It is to be understood that the above description is merely illustrative of preferred embodiments of this invention, of which many variations may be made by those skilled in the art without departing from the spirit thereof.

I claim:

1. A process for producing a phosphate-containing alumina gel comprising reacting in aqueous solution ammonium dihydrogen phosphate and a water-soluble basic aluminum salt characterized by the formula:

$$[Al_a(OH)_bY_c]_x$$

where Y is an acid anion selected from the group consisting of Cl⁻, NO₃⁻, Br⁻ and I⁻; $a$ is a number between 1 and 10; $b$ is a number between 1 and 29; $c$ is a number between 1 and 29; and $x$ is a number between 1 and 10 and in which the ratio of aluminum to acid anion is between about 1.8/1 and about 2.2/1 to effect formation of a homogeneous hydrosol having a pH in the approximate range of 3 to 5 and in which alumina is the major metal oxide constituent, permitting said hydrosol to set to a hydrogel, treating the resulting hydrogel for at least 10 hours with an aqueous solution containing between about 1 and about 20 percent by weight of an ammonium compound selected from the group consisting of ammonium hydroxide and a water-soluble ammonium salt, washing the treated hydrogel free of water-soluble matter, and drying the washed hydrogel.

2. A process for producing an alumina gel characterized by a phosphate-containing residue of at least about 10 percent by weight, which comprises reacting in aqueous solution a water-soluble basic aluminum salt characterized by the formula: $[Al_a(OH)_bY_c]_x$ where Y is an acid anion selected from the group consisting of Cl⁻, NO₃⁻, Br⁻, and I⁻; $a$ is a number between 1 and 10; $b$ is a number between 1 and 29; $c$ is a number between 1 and 29; and $x$ is a number between 1 and 100, and an ammonium acid phosphate to effect formation of a homogeneous hydrosol characterized by a pH of between about 3 and about 5, permitting said hydrosol to set to an all-embracing phosphate-containing alumina hydrogel, aging the hydrogel so obtained in a hydrocarbon oil at a temperature above 125° F. for at least 10 hours, treating the aged hydrogel in an ammonium-containing solution for at least 10 hours to render the hydrogel resistant to disintegration upon contact with aqueous media, thereafter washing the hydrogel free of water-soluble matter, drying the washed hydrogel, and calcining the dried gel.

3. A process for producing a phosphate-containing alumina gel comprising reacting in aqueous solution a water-soluble basic aluminum salt characterized by the formula: $[Al_a(OH)_bY_c]_x$ where Y is an acid anion selected from the group consisting of Cl⁻, NO₃⁻, Br⁻, and I⁻; $a$ is a number between 1 and 10; $b$ is a number between 1 and 29; $c$ is a number between 1 and 29; and $x$ is a number between 1 and 100, and an ammonium acid phosphate to effect formation of a homogeneous hydrosol characterized by a pH between about 3 and about 5, permitting said hydrosol to set to an all-embracing phosphate-containing alumina hydrogel, treating the hydrogel so obtained in a basic medium for a sufficient time to render the hydrogel resistant to disintegration upon subsequent contact with aqueous media, thereafter washing the hydrogel free of water-soluble matter, and drying.

4. A process for producing a phosphate-containing alumina gel comprising reacting in aqueous solution basic aluminum chloride and ammonium dihydrogen phosphate to effect formation of a homogeneous hydrosol characterized by a pH in the approximate range of 3 to 5, permitting said hydrosol to set to an all-embracing hydrogel, treating the hydrogel so obtained in a basic medium for a sufficient time to render the hydrogel resistant to disintegration upon contact with aqueous media, thereafter washing the hydrogel free of water-soluble matter, and drying.

5. A process for producing an alumina gel characterized by a phosphate-containing residue of between about 30 and about 60 percent by weight, which comprises reacting in aqueous solution a water-soluble basic aluminum salt characterized by the formula: $[Al_a(OH)_bY_c]_x$ where Y is an acid anion selected from the group consisting of Cl⁻, NO₃⁻, Br⁻, and I⁻; $a$ is a number between 1 and 10; $b$ is a number between 1 and 29; $c$ is a number between 1 and 29; and $x$ is a number between 1 and 100, and an ammonium acid phosphate to effect formation of a homogeneous hydrosol characterized by a pH of between about 3 and about 5, permitting said hydrosol to set to an all-embracing phosphate-containing alumina hydrogel, aging the hydrogel so obtained in oil at a temperature between about 150° F. and about 212° F. for 15 to 48 hours, treating the aged hydrogel in an aqueous solution containing between about 1 and about 20 percent by weight of an ammonium compound selected from the group consisting of ammonium hydroxide and a water-soluble ammonium salt for a period of between about 10 and about 48 hours, washing the treated hydrogel free of water-soluble matter, drying the washed hydrogel, and calcining the dried gel.

6. A process for forming spheroidal particles of phosphate-containing alumina gel comprising reacting in aqueous solution a water-soluble basic aluminum salt characterized by the formula: $[Al_a(OH)_bY_c]_x$ where Y is an acid anion selected from the group consisting of Cl⁻, NO₃⁻, Br⁻, and I⁻; $a$ is a number between 1 and 10; $b$ is a number between 1 and 29; $c$ is a number between 1 and 29; and $x$ is a number between 1 and 100, and an ammonium acid phosphate to effect formation of a homogeneous hydrosol in which alumina is the major metal oxide constituent and which has a time of gelation of less than about 20 seconds and which has a pH between about 3 and about 5, introducing said hydrosol as a finely divided stream into a column of hydrocarbon oil wherein the hydrosol sets to globules of hydrogel during passage through said column, treating the resulting hydrogel particles in a basic medium for a sufficient time to render the hydrogel particles resistant to disintegration upon subsequent contact with aqueous media, washing the treated hydrogel particles free of water-soluble matter, and drying.

7. A process for forming spheroidal particles of alumina gel characterized by a phosphate-containing residue of at least about 10 percent by weight, which comprises reacting in aqueous solution a water-soluble basic aluminum salt characterized by the formula:

$$[Al_a(OH)_bY_c]_x$$

where Y is an acid anion selected from the group consisting of Cl⁻, NO₃⁻, Br⁻, and I⁻; $a$ is a number between 1 and 10; $b$ is a number between 1 and 29; $c$ is a number between 1 and 29; and $x$ is a number between 1 and 100, and an ammonium acid phosphate to effect formation of a homogeneous hydrosol characterized by a pH of between about 3 and about 5 and a gelation time of less than about 20 seconds, introducing said hydrosol as a finely divided stream into a column of hydrocarbon oil wherein the hydrosol sets to globules of hydrogel during passage through said column, aging the resulting hydrogel particles in a hydrocarbon oil at a temperature above 125° F. for at least 10 hours, treating the aged hydrogel particles in an ammonium-containing solution for at least 10 hours to render the hydrogel particles resistant to disintegration upon contact with aqueous media, washing the treated hydrogel particles free of water-soluble matter, drying the washed hydrogel particles, and calcining the dried spheroidal gel particles.

8. A process for producing spheroidal particles of phosphate-containing alumina gel comprising reacting in aqueous solution ammonium dihydrogen phosphate and a water-soluble basic aluminum salt characterized by the formula: $[Al_a(OH)_bY_c]_x$ where Y is an acid anion selected from the group consisting of $Cl^-$, $NO_3^-$, $Br^-$ and $I^-$; $a$ is a number between 1 and 10; $b$ is a number between 1 and 29; $c$ is a number between 1 and 29; and $x$ is a number between 1 and 10 and in which the ratio of aluminum to acid anion is between about 1.8/1 and about 2.2/1 to effect formation of a homogeneous hydrosol in which alumina is the major metal oxide constituent, which has a gelation time of less than about 20 seconds and which has a pH in the approximate range of 3 to 5, introducing said hydrosol as a finely divided stream into a column of hydrocarbon oil wherein the hydrosol sets to globules of hydrogel during passage through said column, treating the resulting hydrogel particles for at least 10 hours with an aqueous solution containing between about 1 and about 20 percent by weight of an ammonium compound selected from the group consisting of ammonium hydroxide and a water-soluble ammonium salt, washing the treated hydrogel particles free of water-soluble matter, and drying.

9. A process for forming spheroidal particles of phosphate-containing alumina gel having a residual phosphate content of between about 30 and about 60 percent by weight, which comprises reacting in aqueous solution ammonium dihydrogen phosphate and basic aluminum chloride to effect formation of a homogeneous hydrosol having a time of gelation of less than about 20 seconds and a pH between about 3 and about 5, introducing said hydrosol as a finely divided stream into a column of hydrocarbon oil wherein the hydrosol sets to globules of hydrogel during passage through said column, aging the resulting hydrogel particles in oil at a temperature between about 150° F. and about 212° F. for 15 to 48 hours, treating the aged hydrogel particles in a basic ammonium-containing solution for at least 10 hours to render the hydrogel particles resistant to disintegration upon contact with aqueous media, washing the treated hydrogel particles free of water-soluble matter, drying the washed hydrogel particles, and calcining the dried spheroidal gel particles.

References Cited in the file of this patent

UNITED STATES PATENTS

| | | |
|---|---|---|
| 2,301,913 | Weltman | Nov. 17, 1942 |
| 2,402,051 | Ipatieff et al. | June 11, 1946 |
| 2,492,167 | Marisic et al. | Dec. 27, 1949 |
| 2,538,867 | Gregor | Jan. 23, 1951 |
| 2,570,532 | Eisenberg et al. | Oct. 9, 1951 |
| 2,774,743 | Hoekstra | Dec. 18, 1956 |

OTHER REFERENCES

Mellor's "Comprehensive Treatise on Inorganic and Theoretical Chemistry" (1924), vol. 5, page 363.